United States Patent
Di Sabatino, Jr.

[11] 3,785,611
[45] Jan. 15, 1974

[54] SWING DISC CHECK VALVE

[75] Inventor: Roland Di Sabatino, Jr., Collingswood, N.J.

[73] Assignee: Ametek, Inc., New York, N.Y.

[22] Filed: July 13, 1972

[21] Appl. No.: 271,633

[52] U.S. Cl. .................................. 251/25, 251/58
[51] Int. Cl. ........................................ F16k 31/143
[58] Field of Search ............................ 251/58, 25

[56] References Cited
UNITED STATES PATENTS

| 3,062,232 | 11/1962 | McGay | 251/58 X |
| 2,065,596 | 12/1936 | Maccabee | 251/58 X |
| 2,910,266 | 10/1959 | Condello et al. | 251/25 |

*Primary Examiner*—Arnold Rosenthal
*Attorney*—Smythe & Moore

[57] ABSTRACT

A swing disc check valve has a closure or disc member swingably mounted within a valve body to open and close a passage therethrough. A rigid actuating member is pivotally connected to the disc member and extends outwardly of the valve body through a pivotable joint means mounted on the body. The actuating member is actuated by means positioned externally of the body and is guided by the pivotable joint means during the swinging movement of the disc member between open and closed positions.

6 Claims, 7 Drawing Figures

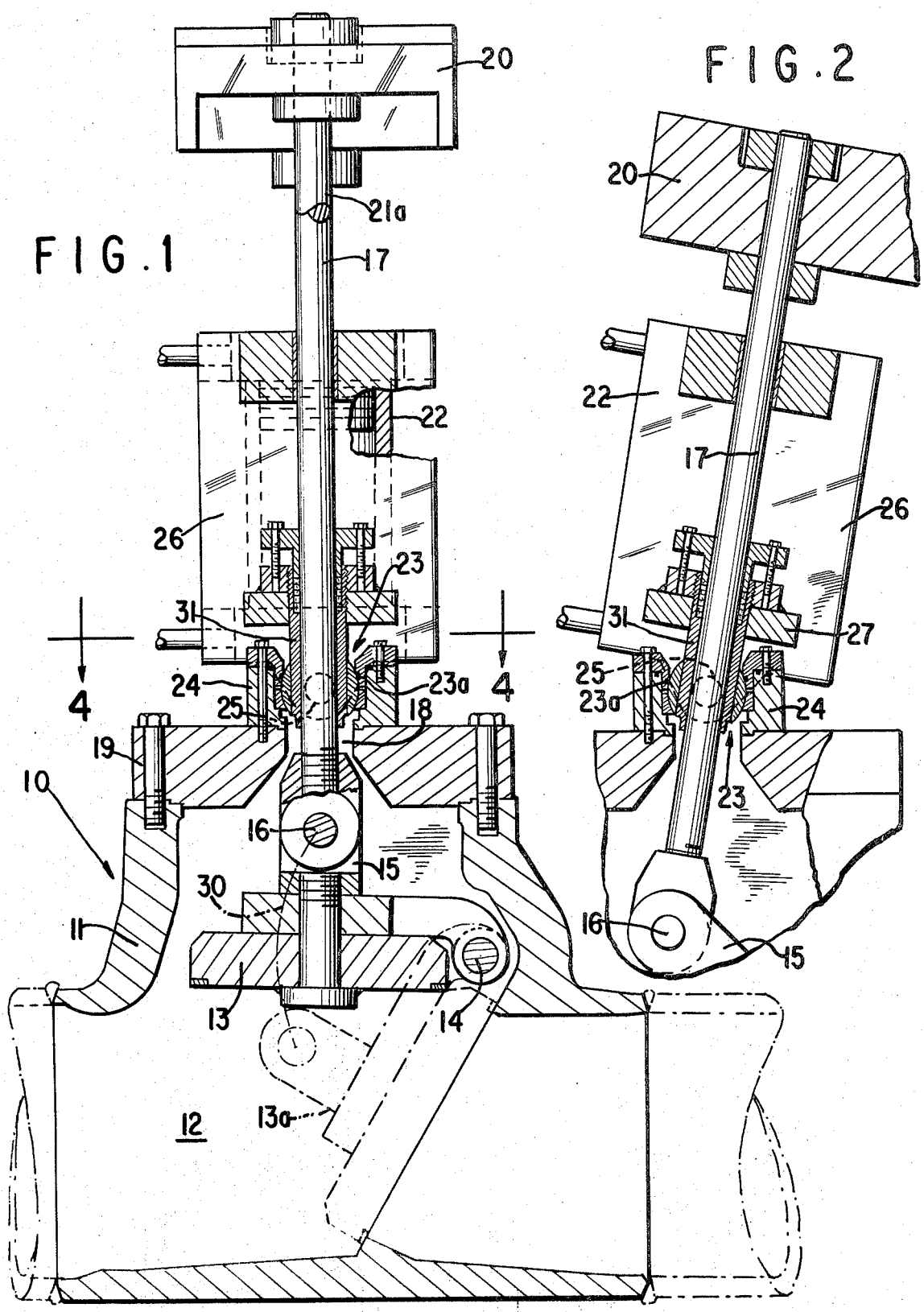

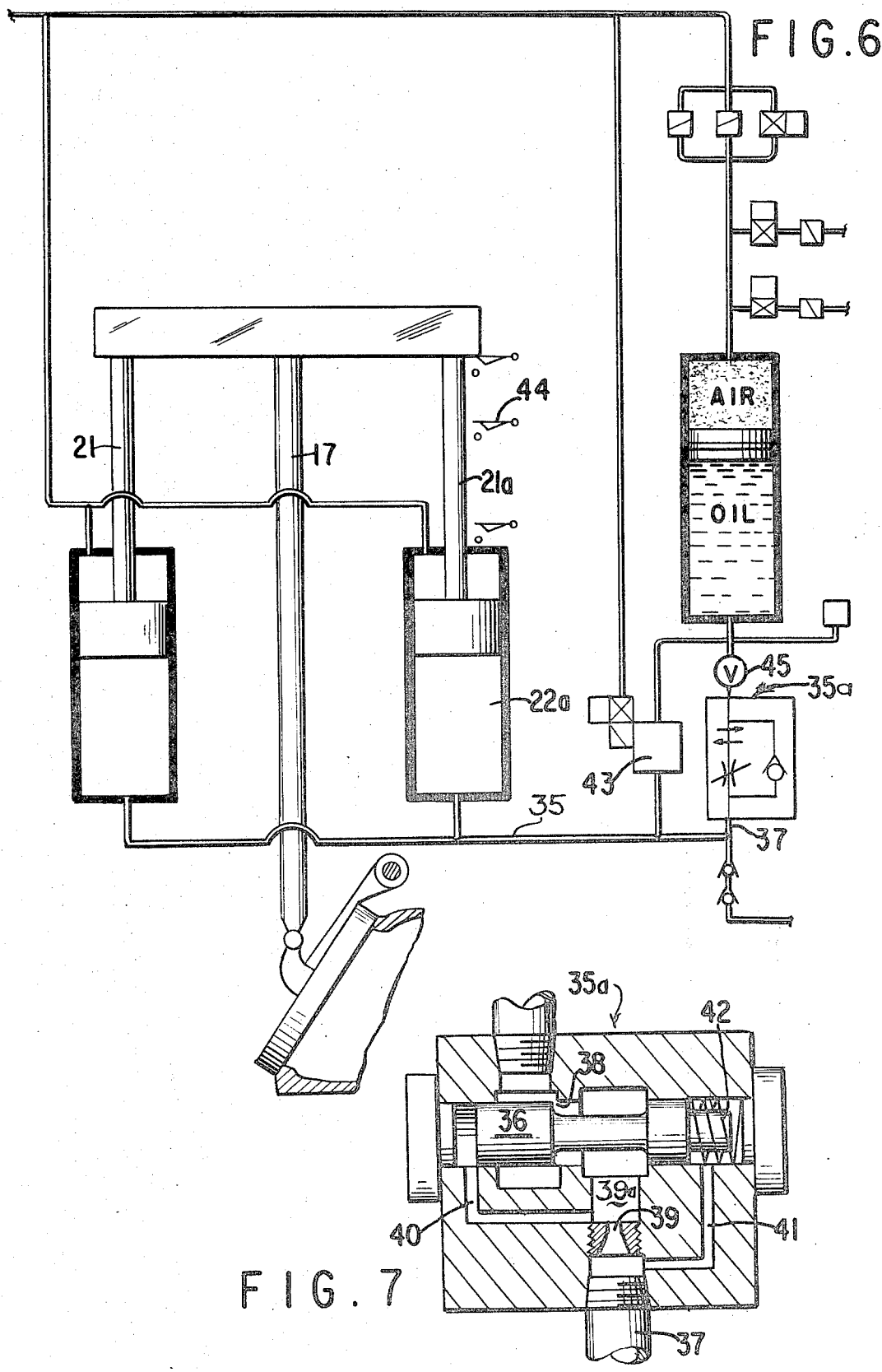

SWING DISC CHECK VALVE

The present invention relates to swing disc check valves and more particularly, to means for guiding the movement of the disc member actuating member during swinging movement of the disc member.

For pipes and pipe lines having relatively large diameters, such as gas mains and steam lines in large power plants, discs or flaps have been used as shut-off or sealing means. Such a shut-off device may comprise a valve mounted in the pipe and having a swingable or pivotal flap or disc which is moved between open and closed positions by an outside actuator. The actuator is connected through a suitable structure which may comprise a linkage to the disc member. Since the connection of the actuator to the disc member moves along a curved path, it is necessary to provide some form of structure to follow the curvilinear movement thereof. Where the actuator comprises a relatively rigid member, which moves axially through a stuffing box mounted on the valve body, several links must be provided between the end of the rigid actuating member and the connection to the closure or disc member.

The use of such a linkage has not been completely satisfactory since it is virtually impossible to close or permit the disc to close at a uniform speed. Such a structure also introduces difficulties when it is attempted to adjust precisely the position of the disc in order to closely regulate the flow through the valve.

One of the objects of the present invention is to provide an improved swing disc check valve.

Another of the objects of the present invention is to provide an improved actuating structure for moving a swingable closure member of a swing disc check valve between open and closed positions.

Another of the objects of the present invention is to provide an actuating arrangement for a swing disc check valve which permits movement of the disc to be accurately and precisely controlled and to enable the disc to be moved at a uniform speed.

According to one aspect of the present invention, the valve may comprise a valve body having a flow passage therethrough with a closure or disc member swingably mounted in the body to open and close the flow passage. Means are mounted externally of the valve body for actuating the closure member. A rigid actuating member operable by the actuating means is pivotally connected to the closure member and is guided by pivotal joint means mounted on the body during swingable movement of the closure member between open and closed positions.

Other objects, advantages and features of the present invention will become apparent from the accompanying description and drawings, which are merely exemplary.

In the drawings:

FIG. 1 is a longitudinal section view through a valve incorporating the present invention;

FIG. 2 is a portion of the view of FIG. 1 and showing the actuating member tilted during swingable movement of the closure member;

FIG. 6 is a schematic diagram of a control means; and

FIG. 7 is an enlarged sectional view of a control valve that can be used in the system of FIG. 6.

Proceeding next to the drawings wherein like reference symbols indicate the same parts throughout the various views, a specific embodiment of the present invention will be described in detail.

Figure 3:
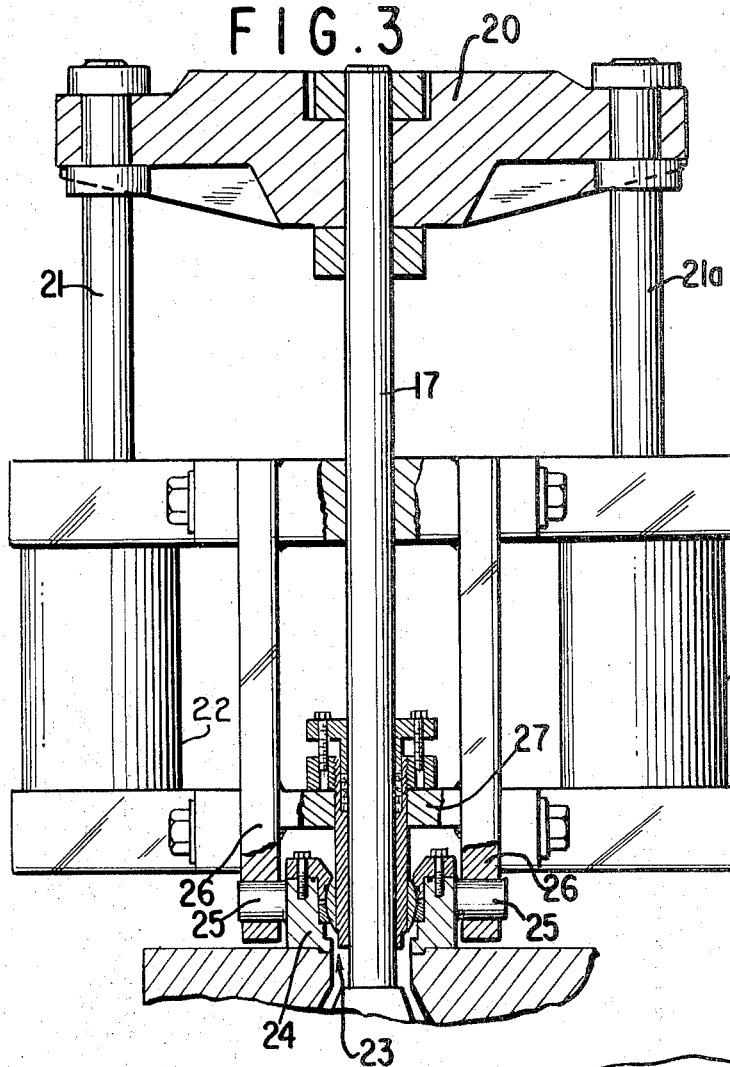
FIG. 3 is a transverse sectional view taken through the upper portion of FIG. 1 and showing hydraulic cylinders employed as actuators.
Figure 4:
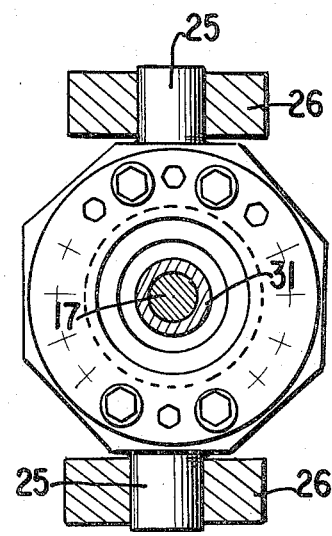
FIG. 4 is a sectional view taken along the line 4—4 of FIG. 1.
Figure 5:
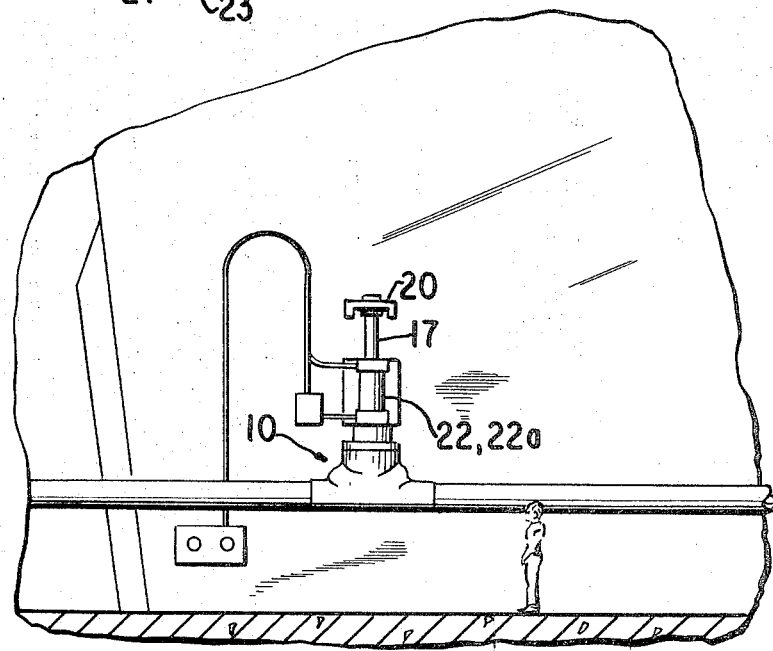
FIG. 5 is a side elevational view of the installation in a pipe line of a valve incorporating the present invention.

As may be seen in FIG. 1, there is indicated generally at 10 a valve incorporating the present invention. The valve 10 comprises a valve body 11 having a flow passage 12 therethrough. A shutter flap or disc 13 is pivotally mounted on a pin 14 to enable the disc to move to the closed position indicated by dashed lines at 13a.

The outer face of the disc 13 is provided with a pair of spaced lugs 15 having a pin 16 therebetween to which is pivotally attached a rigid actuating rod 17. The actuating rod 17 passes upwardly through an opening 18 in a cover plate 19 movably attached to an access opening in the valve body.

The actuator member which in this embodiment is in the form of a rigid rod is connected by a cross member 20 to pistons 21 and 21a of hydraulic cylinders 22 and 22a which function as actuators or controls for the valve movement. The hydraulic cylinders are controlled from a conventional control circuit as is known in the art.

The actuating member 17 passes upwardly through a rotatable or universal joint 23 positioned in a boss 24 mounted on the outer face of the cover plate 19. A pair of pivot pins 25 extend outwardly from the boss 24, and spaced lugs 26 are pivotally mounted thereon. The lugs 26 depend from a bottom cross member 27 which is attached to a frame 28 upon which the hydraulic cylinders 22 and 22a are mounted.

The pivotable joint 23 is sealed and is capable of universal movement to accommodate tilting of the rod. The joint is fabricated so as to include a seal which may be in the form of a stuffing box which permits linear movement of the rod 17 therein. O-ring 23a also may be provided.

When the shutter flat 13 is in the open position as shown in FIG. 1, the actuating rod 17 extends vertically upwardly through the universal joint 23.

When the actuating fluid cylinders are controlled to permit the actuating rod 17 to move downwardly to close the disc, the pivotal connection 16 will move along a curved path indicated by the dashed lines 30 in FIG. 1. As this joint moves along the dashed lines, the actuating rod 17 will pivot to follow this movement, and at the same time, the frame work supporting the actuator cylinders will pivot on the pins 25 in a plane substantially parallel to the flow passage of the valve.

The actuating rod 17 and the frame for supporting the hydraulic cylinders will then tilt back to virtually a vertical position when the shutter flat is in the closed position 13a.

The hydraulic cylinders are actuated to operate in the opposite direction when it is desired to open the valve. The actuating rod 17 together with the hydraulic cylinder supporting frame, will tilt in the same manner.

The advantage of this construction is that there is a direct connection at all times between the rigid actuating rod 17 and the swingable shutter flat 13. This enables the shutter flat 13 to be moved at a uniform speed and permits precise positioning of the shutter flat by actuation of the hydraulic cylinders.

To improve the sealing between the universal joint and the actuating shaft, the joint may be provided with an elongated cylinder such as 31 shown in FIG. 2 within which may be positioned a packing to contact the rod 17.

The hydraulic or fluid flow to and from the actuators can be controlled so as to regulate velocity of closing to an acceptable level which will prevent damage to the valve seat when struck by the disc. Such a regulating means can be in the form of a pressure compensated flow control valve which functions so that regardless of the magnitude of the forces acting on the valve disc, the fluid in the actuators or cylinders 22 and 22a will exit from the actuators through the flow control valve at a fixed or constant flow rate.

One example of a control system is seen in FIG. 6. Cylinder 22a and piston 21 are connected to a discharge line 35 to the pressure compensated flow control valve 35a schematically shown therein. One form of a control valve 35a which can be used is shown in FIG. 7. The control valve has spool 36 and outlet passage 37 (FIGS. 6, 7). The fluid passing through valve 35 and to the spool element 36 will pass through the narrow annular orifice 38 and to outlet 37 through a fixed control orifice 39. Pressure from chamber 39a is impressed on the left side of spool 36 (FIG. 7) through channel 40 and pressure on the downstream side of orifice 39 is fed to channel 41 to the right-hand end of spool 36 (FIG. 7). Spring 42 is used to balance dynamic flow forces.

If flow increases through 35, then a signal will pass to the left end of spool 36 and cause the spool to move to the right to close orifice 38. Such, in turn, will maintain a constant pressure difference upstream and downstream of orifice 39 resulting in constant flow through the valve regardless of upstream pressure in line 35. Pressure in line 35 varies as a function of the flow acting on the disc in the main valve body. The other cylinder also is connected to line 35. In case of failure of the pressure compensated flow control valve 35a, valve 43 is provided to bypass the fluid. For example, valve 43 is operated if limit switch 44 is not triggered within a short time, such as three seconds.

Another failure mode of operation if the pressure compensated control valve 35a fails to open is provided by a "fail safe" valve 45 which has a fixed orifice size for a maximum flow condition, which if exceeded, would cause damage to the system because of the disc hitting the valve body at too high a velocity.

The foregoing described control is particularly useful in conjunction with hydraulic or lqiuid means. When the fluid is a gas, the fixed orifice may be sufficient to control the movement of the disc. Other types of control can be used.

It will be understood that changes in various details of construction and arrangement of parts may be made without departing from the spirit of the invention except as defined in the appended claims.

What is claimed is:

1. In a valve, the combination of a valve body having a flow passage therethrough, a shutter flap member swingably mounted in said body to close and open said flow passage, hydraulic actuated means externally of said body for controlling actuation of said shutter flap member, an apertured cover plate on said body having a universal sealed joint means thereon, a tiltable rigid rod slidably extending through said joint means and operable by said actuating means and pivotally connected to said shutter flap member, said joint means guiding said rigid rod during its slidable and tiltable movement and the swingable arcuate movement of said shutter flap member between open and closed positions when said rigid rod is operable by said actuating means.

2. In a valve as claimed in claim 1 wherein said actuating means comprises a fluid operated cylinder.

3. In a valve as claimed in claim 1 wherein said joint is pivotable in a plane parallel to the flow passage of the valve.

4. In a valve as claimed in claim 1 wherein fluid resistance means operate to control movement of said valve.

5. In a valve as claimed in claim 1 wherein the means for controlling movement of said disc includes constant velocity means for movement of the disc.

6. In a valve as claimed in claim 5 wherein said constant velocity means includes pressure compensated flow control valve means.

* * * * *